United States Patent [19]

Fujio

[11] 4,287,700

[45] Sep. 8, 1981

[54] MACHINE FOR FITTING A SLEEVE SEAL OF A FLAT FORM OVER A CONTAINER

[75] Inventor: Masaaki Fujio, Suita, Japan

[73] Assignee: Fuji Seal Industry Co., Ltd., Osaka, Japan

[21] Appl. No.: 81,809

[22] Filed: Oct. 4, 1979

[30] Foreign Application Priority Data

Sep. 23, 1979 [JP] Japan .................................. 53-130333

[51] Int. Cl.³ ........................... B65B 7/28; B67B 5/00
[52] U.S. Cl. ......................................... 53/292; 53/295
[58] Field of Search ......................... 53/291, 292, 295; 156/86, DIG. 14

[56] References Cited

U.S. PATENT DOCUMENTS

| | | | |
|---|---|---|---|
| 2,068,107 | 1/1937 | Nygard | 53/291 |
| 2,680,549 | 6/1954 | Levy | 53/295 |
| 2,732,115 | 1/1956 | Allen | 53/292 |
| 4,144,631 | 3/1979 | Fujio | 53/291 X |

Primary Examiner—Horace M. Culver
Attorney, Agent, or Firm—Zarley, McKee, Thomte, Voorhees & Sease

[57] ABSTRACT

A machine for fitting a sleeve seal of a flat form over a container, wherein a pair of half-mandrels are mounted on a rotating member so as to be movable apart and together. A pair of suction cups grip the sleeve seal and move apart so as to somewhat open it; then the suction cups move, together, towards the axis of the rotating member so as to put the sleeve seal over the half-mandrels, which are together; then the rotating member rotates and the half-mandrels move apart to open up the sleeve seal; and then the half-mandrels are aligned over the container, and a pushing means pushes off the sleeve seal from the half-mandrels.

3 Claims, 5 Drawing Figures

MACHINE FOR FITTING A SLEEVE SEAL OF A FLAT FORM OVER A CONTAINER

BACKGROUND OF THE INVENTION

The present invention relates to a machine for fitting a sleeve seal onto a container, and more particularly relates to a machine for fitting automatically a sleeve seal of a flat form onto the top of the container such as a bottle.

When a sleeve seal, which is usually a tube of heat-shrinkable film, is supplied in a collapsed form, flat like a piece of ribbon, it is quite difficult to open it up so that it can be fitted over the neck of a container and heat-shrunk thereonto. The difficulty is accentuated if the process is to be performed rapidly and repeatedly by an automatic machine.

In the prior art, such a sleeve seal has been opened up by suction cups. However, in this case, only the central part of the tube can be opened up, and the edges of the flattened seal cannot be satisfactorily stretched so as to open them up. Thus the size of the sleeve seal must be considerably larger than the neck of the container, over which it is to be fitted, and this may well mean that a tight seal cannot be attained, since the amount of shrinkage available from the film while preserving its desirable characteristics is limited.

SUMMARY OF THE INVENTION

Therefore, it is an object of the present invention to provide a machine for automatically putting a sleeve seal of a flat form over a container, in which the aforementioned disadvantage of the prior art is at least partially overcome.

According to the present invention, this and other objects are attained by a machine for fitting a sleeve seal of a flat form over a container, comprising: a rotating member; a pair of half-mandrels mounted on the rotating member with their longitudinal axes substantially intersecting the axis of rotation thereof, and which can move towards and away from one another; a pair of suction cups for opening the flat sleeve seal, which can move towards one another and away from one another, and which also can move together towards and away from the axis of the rotating member; a means for pushing off the sleeve seal opened which is fitted over the half-mandrels, which when the rotating member is in a certain predetermined position can be moved towards and away from the axis thereof along the longitudinal direction of the half-mandrels; and a means for moving the mandrels, a means for moving the suction cups, and a means for moving the pushoff means.

BRIEF DESCRIPTION OF THE DRAWINGS

The present invention will become more clearly understood from the following description of several preferred embodiments thereof, and from the accompanying drawings which illustrate the embodiments. These embodiments and drawings, however, should not be taken as limiting the present invention in any way, nor as limiting the scope of protection desired to be secured by Letters Patent; the scope of the present invention, and of the monopoly sought, are to be determined solely by the accompanying claims. In the drawings:

DESCRIPTION OF THE PREFERRED EMBODIMENTS

Figure 1:
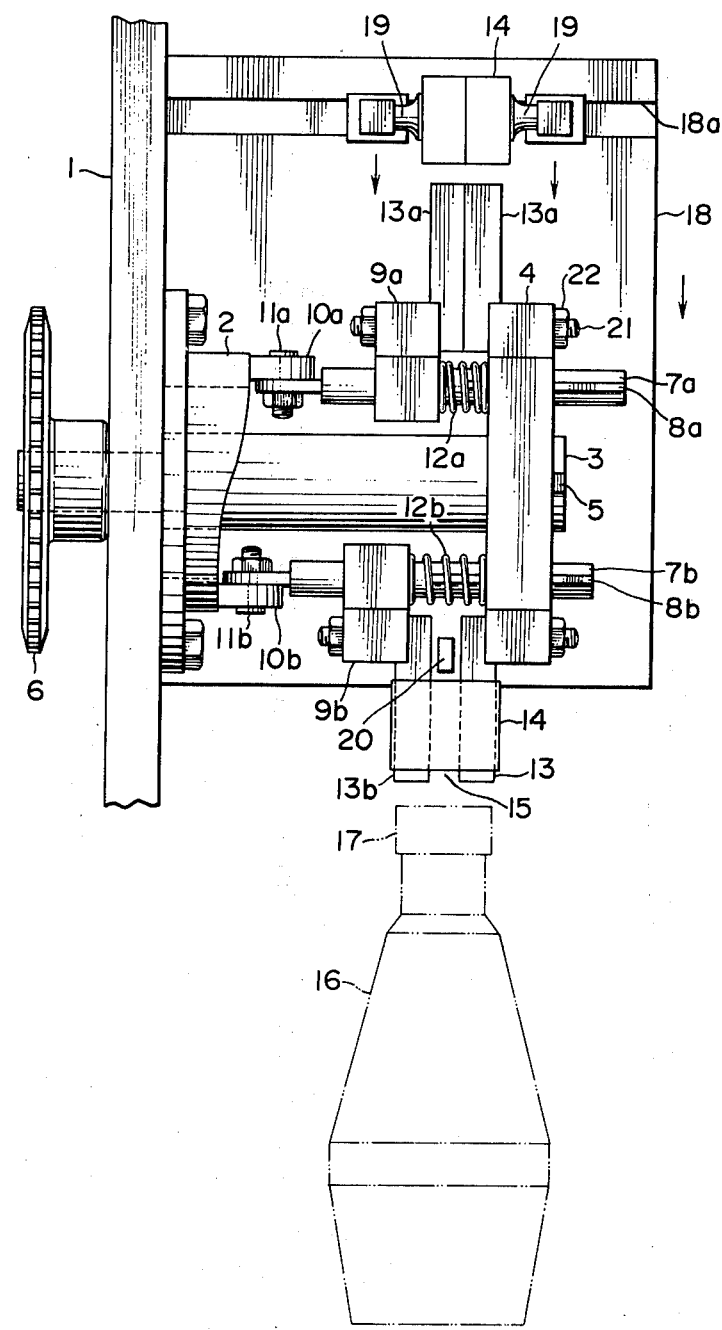
FIG. 1 is an elevational view of a machine which is an embodiment of the present invention, showing two sleeve seals which are being manipulated by the machine.
Figure 2:
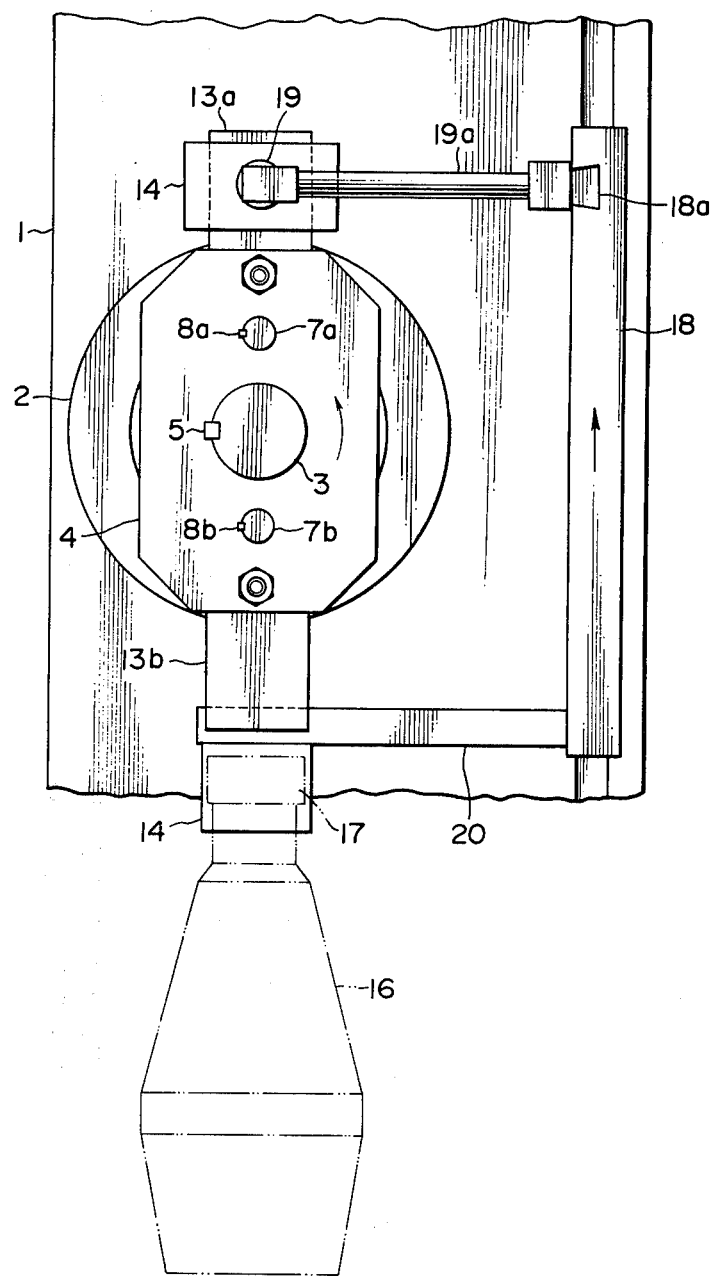
FIG. 2 is a side view of the machine in FIG. 1, at the stage when a sleeve seal has just been fitted to a container.
Figure 3:
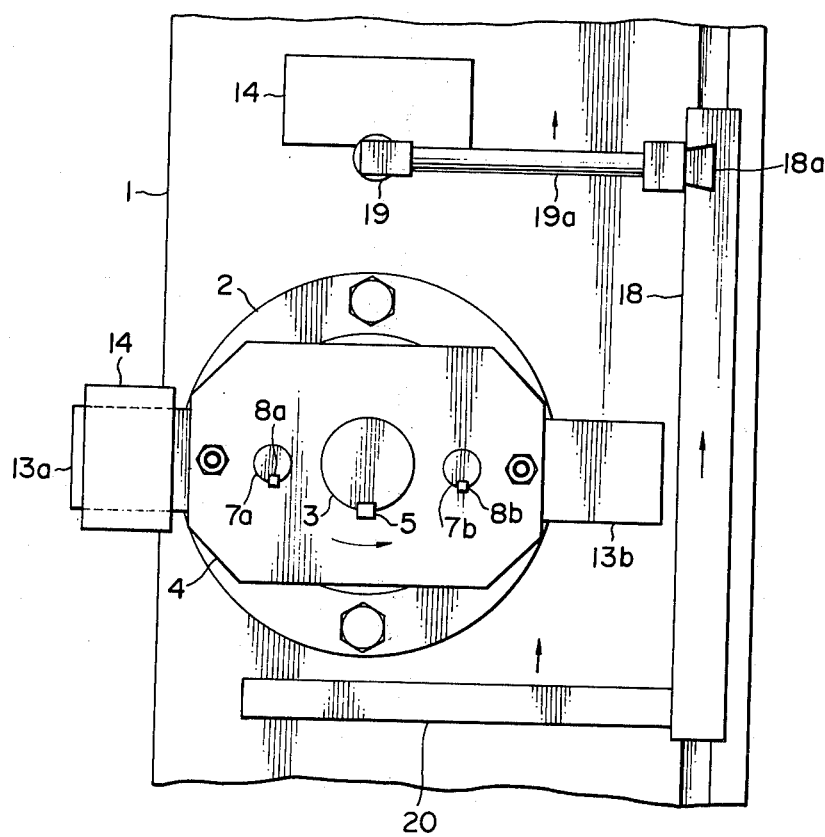
FIG. 3 is a view similar to FIG. 2, showing the machine in the act of extending a sleeve seal.

Referring to FIGS. 1, 2, and 3, in which the first preferred embodiment of the present invention is shown, a vertical base plate 1 is provided with a cylindrical cam 2 fixed to it by a flange, and a rotary shaft 3 is rotatably mounted to the base plate 1, passing from left to right in the drawing. The left hand end of the shaft 3 is fitted with a sprocket 6 for driving the shaft. On the right hand end of the shaft 3 is fitted by a key 5 a rotary plate 4 which carries the actual sleeve seal fitting mechanisms. In the shown embodiment, two sleeve seal fitting mechanisms are provided. Each of these comprises a slide shaft 7 (suffixes "a" and "b" are affixed to the reference numbers in the drawing, to indicate that they refer to parts in the one or the other sleeve seal fitting mechanism "A" or "B"), and this slide shaft 7 slides in a hole bored through the rotary plate 4. The two holes for the two slide shafts 7a, 7b are 180° apart on the rotary plate 4. The slide shaft 7 is kept from rotating in the hole by a slidably key 8. The left hand end of the slide shaft 7 follows the cylindrical cam 2 by a roller 10 which rolls thereon, pivotally mounted on a pin 11; and the shaft 7 is biased towards the cam 2 by a spring 12 which bears on the rotary plate 4 and on a block 9 fixed to the shaft 7.

For each sleeve seal fitting mechanism there are two half-mandrels 13, 13, one of which is fitted to the rotary plate 4 by a bolt and nut 21 and 22, and the other of which is fitted to the block 9. Thus these half-mandrels 13 can be moved towards one another and away from one another, as the shaft 3 and the rotary plate 4 revolve, by the rolling of the roller 10 on the cam 2. When they are together, in this embodiment, the half-mandrels 13 define an elliptical cylinder. The reason for this is that when they are together of course the assembly should have no sharp edges which might pierce a seal fitted over it; and when the half-mandrels are separated somewhat, as will be apparent hereinafter, their outside-defined surface should be, approximately, a circular cylinder. The combination of these two requirements leads to the elliptically cylindrical shape of the assembly of the two half-mandrels (said elliptical cylinder being divided down its major axis) as being an effective one.

The timing of the circular cam 2 is such that when the half-mandrels are at the bottom in FIG. 1 they are separated, and when they are at the top in FIG. 1 they are together.

The half-mandrels are, as seen in the drawings, mounted to the rotary plate 4 so that their axes approximately intersect the rotational axis of the shaft 3 and the plate 4.

A vertical plate 18 is mounted, behind the shaft 3 etc. as seen in the drawing, and is raised upwards and lowered downwards with the proper timing to accomplish functions which will be hereinafter described. A groove 18a extending horizontally is formed on the upper portion of the plate 18, and in this groove slide two arms 19_a_ and two suction cups 19 connected thereto so that they can approach one another and move away from one another. These cups 19, again, are moved by a means not shown in the drawing, with the correct timing. The means for moving the suction cups 19 and the plate 18, and its control arrrangement, is per se conventional, and will be easy to construct for one skilled in the art, based upon the present invention.

Thus, the suction cups can move towards and away from one another, by movement along the groove 18_a_, and can also move together towards and away from the axis of the shaft 3, by the movement of the plate 18.

Further, a push bar 20 is mounted to the plate 18, in such a position that when the plate 18 moves downwards the bar 20 moves down between the opened half-mandrels 13, in their longitudinal direction, generally substantially towards and away from the axis of the shaft 3.

This machine operates as follows. First, a sleeve seal designated by 14 is supplied between the suction cups 19, which are moved together so as to grip it. At this time the seal is in collapsed form, and the plate 18 is in its uppermost position. Next, the cups 19 are moved apart, along the groove 18_a_. Thus opening the seal, although as stated above the seal is not completely opened by this. This position is shown in FIG. 1. Next, the plate 18 is moved downwards, so that the half-mandrels 13, which at this time are held by the rotatory plate 4 directly underneath the sleeve seal 14, enter into its opening. When the sleeve seal has been put completely over the half-mandrels—this state is shown in FIG. 2—then the suction cups 19 are released from it. Next, the plate 4 is rotated, and when it has reached the position shown by FIG. 3 the plate 18 has been raised, and also the half-mandrels have been moved apart, by the action of the cam 2, so as fully to open up the sleeve seal 14 and to break any adhesion that might exist next to the folded parts, which, as explained above, are difficult properly to open up by suction cups alone. The rotary plate 4 continues to rotate until it reaches the position shown by FIG. 1—again, but wherein the half-mandrel assemblies 13_a_ and 13_b_ have been interchanged—so that the sleeve seal 14 which is now being considered is the lowermost one in FIG. 1. Then, as before, the plate 18 is lowered, and thereby the push bar 20 moves down through the gap 15 between the opened half-mandrels, pushing down the opened sleeve seal over the neck 17 of the bottle 16 which is positioned just below the ends of the half-mandrels. Since the shape of the half-mandrels is half-elliptic, and they are somewhat apart from one another, the shape of the seal, as stretched over them, is approximately circular, so that it can go easily over the bottle neck. FIG. 2, in its lower part, shows the seal 14 over the bottle neck.

Meanwhile, as will be easily understood, the upper half-mandrels 13 are receiving the next sleeve seal. Thus, as the rotary plate 4 revolves, and the plate 18 moves up and down (twice for each rotation of the plate 4), sleeve seals are fitted repeatedly over the necks of bottles. The bottles are fed to the appropriate position by a per se conventional means not shown in the figures.

Figure 4:
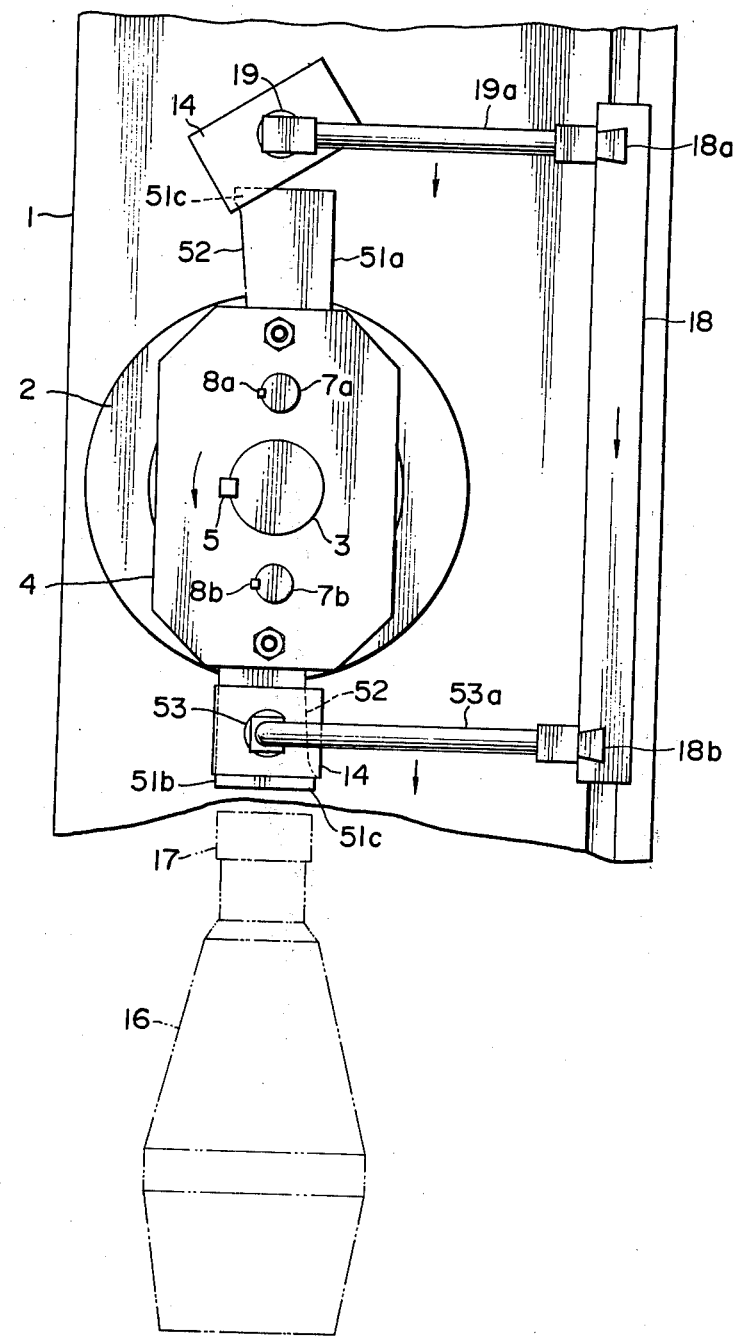
FIGS. 4 and 5 are views similar to FIGS. 2 and 1, respectively, showing a second embodiment of the present invention.
Figure 5:
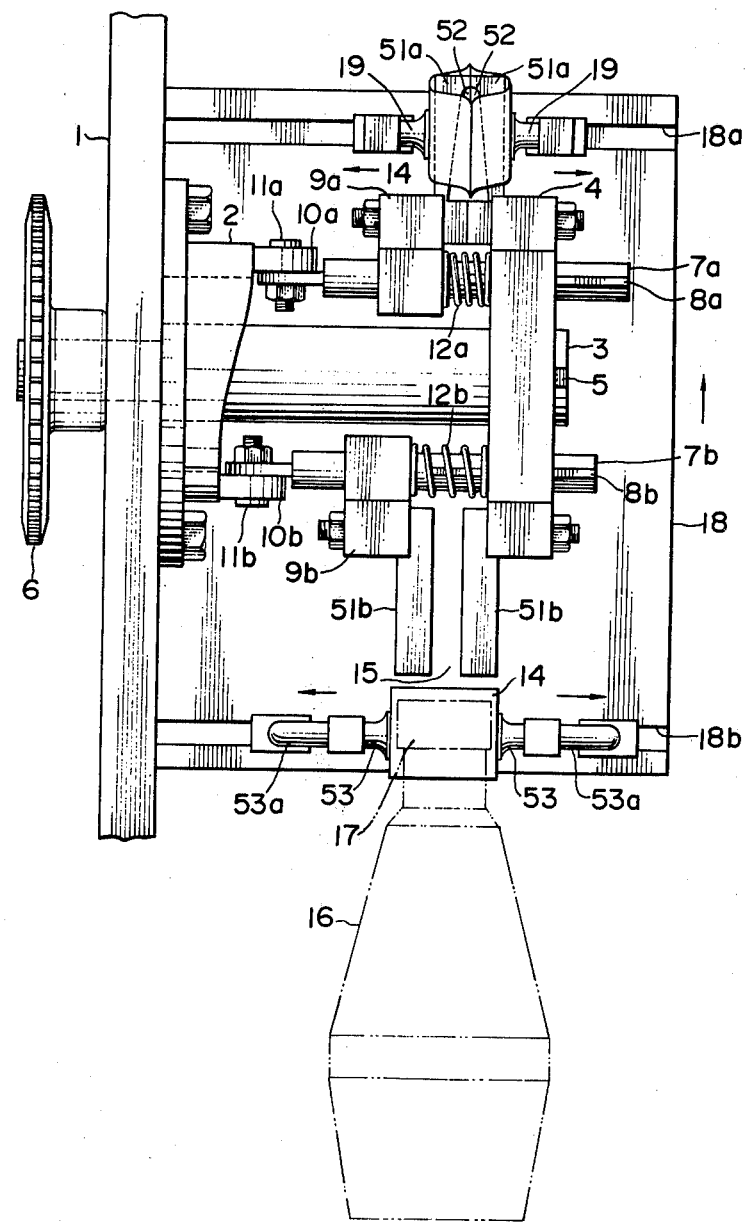

FIGS. 4 and 5, which respectively correspond to FIGS. 2 and 1, show a second embodiment of the present invention. In these figures, the parts which are the same as those in the first embodiment are designated by the same reference numerals, and detailed description of them will be omitted with the view of economizing explanation.

In this second embodiment, first, the pushoff system for the sleeve seal, which in the first embodiment was the bar 20, is different; it comprises a pair of suction cups 53 which are mounted on the ends of arms 53_a_ which slide in a groove similar to the groove 18_a_. The means which moves these arms 53_a_, and its control mechanism, is per se well known, and not shown here. During the cycle of the machine, when the sleeve seal must be put over the neck of the bottle, the suction cups 53 are moved together along the groove 18_b_ until they grip the seal, which is extended over the half-mandrels 51. In some cases, this method may be more gentle to the sleeve seal, and run less risk of crumpling it.

Secondly, the half-mandrels 51 are formed rather differently. As best seen in FIG. 4, in which the direction of rotation of the plate 4 is anti-clockwise, the lower leading part 52, of the elliptical cylinder formed by the half-mandrels when they are together is cut away, so that a sort of hook protuberance 51_c_ is left sticking out on the leading side of the half-mandrel assembly as it rotates, remote from the axis of the shaft 3. In this embodiment, the cutaway part 52 slants, so that it is thicker towards the axis of the shaft 3. Further, although in the shown embodiment the division between the half-mandrels is perpendicular to the axis of the shaft 3, this is not strictly necessary to the present invention, and in other embodiments this plane could be otherwise arranged; in which case, the cutaway 52 might only require to be formed in one of the half-mandrels.

This cutaway 52 and hook protuberance 51_c_ function as follows. As seen in FIG. 4, in this embodiment, the sleeve seal is supplied to the machine in a slanting position, and is held therein by the suction cups 19. As the half-mandrel assembly rotates, the hook protuberance 51_c_ nears the lower edge of the sleeve seal, and, thus, the seal neatly and easily covers the half-mandrel assembly as the plate 18 descends, due to the cutaway.

Although the present invention has been shown and described with reference to several preferred embodiments thereof, it should not be considered as limited to these, however, or mere and simple generalizations, or other detailed embodiments. Yet further alterations and omissions to the structure of any particular embodiment could be made without departing from the spirit or the scope of the present invention, which are to be defined only by the appended claims.

I claim:

1. A machine for fitting a sleeve seal of a flat form over a container, comprising:

a rotating member;

a pair of half-mandrels mounted on the rotating member with their longitudinal axes substantially intersecting the axis of rotation thereof, and which can move towards and away from one another;

a pair of suction cups for opening the flat sleeve seal, which can move towards one another and away from one another, and which also can move together towards and away from the axis of the rotating member;

a means for pushing off the sleeve seal opened which is fitted over the half-mandrels, which when the rotating member is in a certain predetermined position can be moved towards and away from the axis thereof along the lontitudinal directions of the half-mandrels; and a means for moving the mandrels, a means for moving the suction cups, and a means for moving the push-off means; wherein the half-mandrels are formed as halves of an elliptical cylinder, with such a part cut away on at least one of the half-mandrels so that, when they are brought together so that their outside circumferential surfaces form part of the surface of said elliptical cylinder, a part of the side of said elliptical cylinder which is leading as the rotating member rotates is cut away, and more so towards the part of said elliptical cylinder which is nearer to the axis of said rotating member, so as to present a protuberance at the outer leading portion of said elliptical cylinder.

2. A machine according to claim 1, wherein the push-off means comprises a bar which, when the rotating member is in said predetermined position with the half-mandrels apart, can be moved between the half-mandrels.

3. A machine according to claim 1, wherein the push-off means comprises a pair of suction cups.

* * * * *